H. W. HENLEY.
MACHINES FOR MITERING PRINTERS' LEADS AND RULES.

No. 169,638. Patented Nov. 9, 1875.

WITNESSES.
John Cook
George Damon

Henry W. Henley by A. Sidney Doane atty
INVENTOR.

N. PETERS, PHOTO-LITHOGRAPHER, WASHINGTON, D. C.

UNITED STATES PATENT OFFICE.

HENRY W. HENLEY, OF NEW YORK, N. Y.

IMPROVEMENT IN MACHINES FOR MITERING PRINTERS' LEADS AND RULES.

Specification forming part of Letters Patent No. 169,638, dated November 9, 1875; application filed September 10, 1875.

*To all whom it may concern:*

Be it known that I, HENRY W. HENLEY, of the city, county, and State of New York, have invented, made, and applied to use a new and useful Machine for Mitering Printers' Leads and Rule; and that the following is a full, clear, and correct description of my invention, reference being had to the accompanying drawing, making part of this specification, and to the letters of reference marked thereon, in which—

Figure 1:
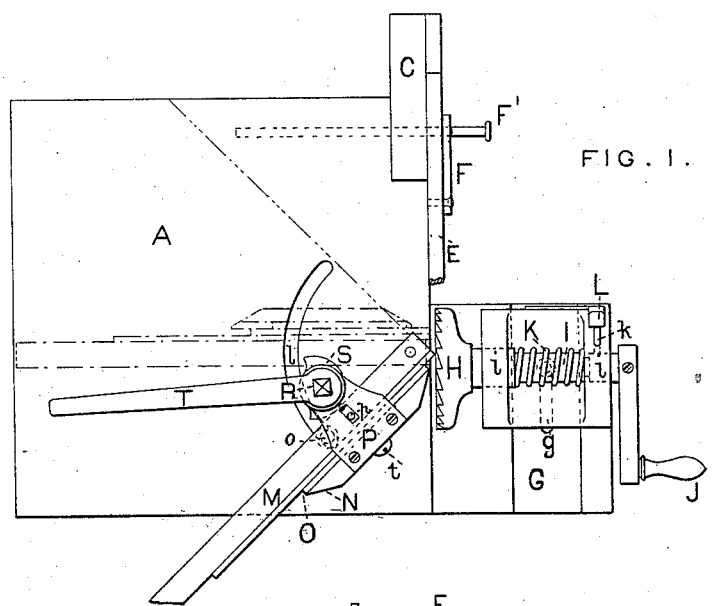
Figure 2:
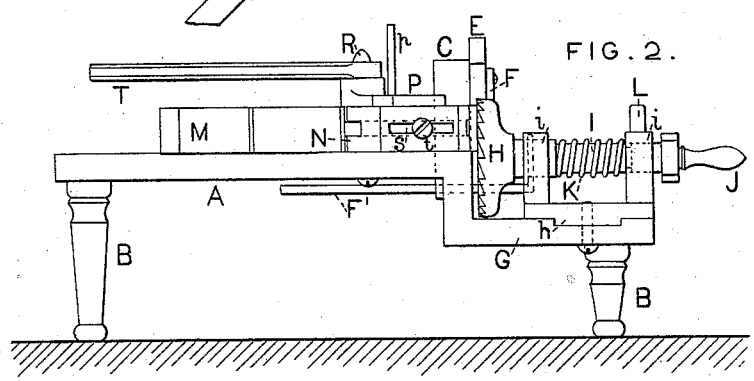
Figure 3:
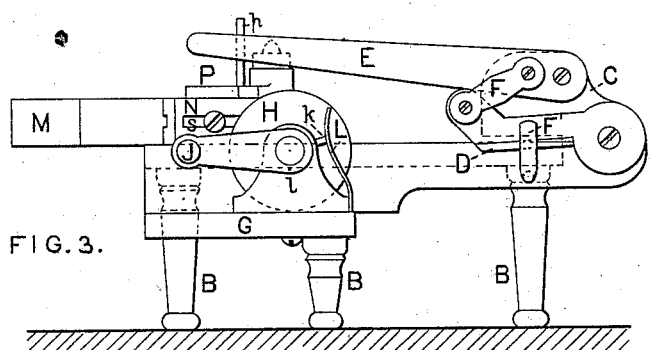

Figure 1 is a top view of my invention. Fig. 2 is a front view of the same. Fig. 3 is an end view of the same.

In the drawings like parts of the invention are designated by the same letters of reference.

The nature of the present invention consists in the construction, as more fully hereinafter set forth, of a new and useful machine for cutting and mitering printers' leads and rule; the object of the invention being the production of a machine for the purposes set forth, that shall be simple in construction, easily operated, and afforded at a low price to the consumer.

To enable those skilled in the arts to make and use my invention, I will describe the same.

A shows the table or bed of the machine supported upon and by the legs B. This table or bed may be of iron or any suitable material, and upon it the leads and rules to be cut or mitered are placed or held. Attached upon one end of the table A is the support C for the knife or cutter D, and the lever E for operating the same, both the cutter and lever for operating it being pivoted to this support C, the knife or cutter D being pivoted below the lever E and connected to the same by means of a link or short lever, F, so that a compound leverage is employed in operating the knife or cutter D by depressing or drawing down the lever E. F' is a gage, to be used in connection with the lead or rule portion of the machine. This consists of a round rod having its forward end bent up at right angles to its body and flattened, and its rear end passed through an opening in one end of the table A below the cutter D. This gage F' is placed and projects beyond the cutting-edge of the cutter D the distance necessary to allow the rule or lead to be cut to project or overhang the table the length required for it when cut. The gage F' may be fastened in the required position after being adjusted in any convenient manner. Attached at one end to the frame A is the support G for supporting the rotary cutter H and its spindle I. This support G is provided about centrally with an oblong slot, $g$, so that the position of the rotary cutter H may be varied to the extent of the length of the slot. The support G is also grooved upon its upper side to form ways, in which the block $h$, to which are attached the supports $i$ for the spindle I, moves to and fro as the position of the rotary cutter is varied. I is a spindle, moving freely in the supports $i$, upon the forward end of which is secured the rotary cutter H, and on its opposite end a crank or handle, J. K is a spiral spring, passed over the spindle I, made sufficiently strong to hold the rotary cutter H well up to its work, and $k$ is a pin attached to a flat spring, L, and let into one of the supports $i$, and bearing against the spindle I to hold the same in position.

The clamp for holding the rule to be mitered is thus constructed: The table A is provided with a slot, $l$, forming an arc of a circle, the center of which is the pivot upon which the clamping device is turned. M is a bar of metal, provided with a pin, $o$, entering the slot $l$ in the bed A, and also with a pin or upright, $p$, which is passed into the slot in the plate P secured to the upper edge of the secondary bar of metal N. This bar N is slotted at $s$, and mortised to receive the tenoned portion of the plate of metal O, which plate O is adjusted relatively to the bar N and held in position by a set-screw, $t$. P shows a top plate attached to the bar N, in the forward end of which plays a spindle, R, having upon it a cam, S, and handle or lever T. This top plate P is slotted to be passed over the pin or upright $p$ in the bar M, so that the bar N is brought upon one side of the bar M, and the cam S upon the opposite side.

When desired to miter rule, it will be received between the bars M and O, and the lever T is turned until the cam S is brought to bear firmly upon the plate M, causing the rule to be firmly secured between the bars M and O.

It will be observed that the bar N can be placed upon either side of the bar M, or is interchangeable.

Such being the construction, the operation is as follows: When used as a lead-cutter, the gage F¹ is adjusted to the length it is desired to cut the lead. The lead is placed upon the bed A and projects beyond the same as far as the gage F' will permit it to. The lever or handle E is grasped by the hand of the operator and depressed, and the knife or cutter D, connected to the lever by the link F, is brought down, and the projecting portion of the lead is cut from the body of the same, a compound leverage being employed in effecting the cutting of the lead. When used as a mitering-machine, the rule is clamped between the plates of metal M and O. The cam S is brought to bear against the plate M. The clamping device is placed at the proper or desired angle by moving it in the arc of a circle, $l$, and the pin $k$ being withdrawn from pressure upon the spindle I by forcing back the spring L, the cutter H is forced up against the end of the rule to be mitered, and by turning the handle J the cutter H is revolved, mitering the rule presented to it, the spring K holding it up to its work.

I disclaim the devices for cutting leads and rules.

Having now set forth my invention, what I claim as new, and desire to secure by Letters Patent, is—

The clamping device composed of the parts M, N, O, P, R, S, and T, constructed and operating substantially as described, in combination with a bed, A, and rotary cutter H, supported upon a movable spindle, I, and operating substantially as described, for the purposes set forth.

HENRY W. HENLEY.

Witnesses:
A. SIDNEY DOANE,
FRAS. DOMINICK.